United States Patent [19]

O'Hair

[11] Patent Number: 4,764,973

[45] Date of Patent: Aug. 16, 1988

[54] WHOLE WORD, PHRASE OR NUMBER READING

[75] Inventor: Mark A. O'Hair, Shalimar, Fla.

[73] Assignee: The United States of America as represented by the Secretary of the Air Force, Washington, D.C.

[21] Appl. No.: 867,642

[22] Filed: May 28, 1986

[51] Int. Cl.⁴ .............................................. G06K 9/00
[52] U.S. Cl. ...................................... 382/14; 382/15; 382/43
[58] Field of Search ....................... 382/15, 14, 30, 43, 382/34, 48

[56] References Cited

U.S. PATENT DOCUMENTS

| | | | |
|---|---|---|---|
| 3,334,335 | 8/1967 | Brick et al. | 340/172.5 |
| 3,846,752 | 11/1974 | Nakano | 382/43 |
| 3,869,697 | 3/1975 | Kawasaki | 382/43 |
| 3,876,946 | 4/1975 | LaClair et al. | 325/363 |
| 4,010,445 | 3/1977 | Hoshino | 340/146.3 WD |
| 4,254,400 | 3/1981 | Yoda et al. | 340/146.3 MA |
| 4,479,241 | 10/1984 | Buckley | 382/15 |
| 4,490,851 | 12/1984 | Gerhart et al. | 382/43 |
| 4,513,441 | 4/1985 | Henshaw | 382/43 |
| 4,513,442 | 4/1985 | Scherl | 382/48 |

OTHER PUBLICATIONS

"Whole Word Recognition Based on Low Frequency Fourier Complex and Amplitude Spectrums", Thesis by Mark O'Hair, copyright 1984.

L. F. Bush, The Design of an Optimum Alphanumeric Symbol Set for Cockpit Displays, MS Thesis, School of Engineering, Air Force Institute of Technology (AU), Wright-Patterson AFB, Ohio, Dec. 1977 (Defense Technical Information Center (DTIC), No. ADA053-447).

R. A. Simmons, Machine Segmentation of Unformatted Characters, MS Thesis, School of Engineering, Air Force Institute of Technology (AU), Wright-Patterson AFB, Ohio, Dec. 1981 (STIC No. ADA115-556).

C. H. Rodoy, Pattern Recognition by Fourier Series Transformations, MS Thesis, School of Engineering, Air Force Institute of Technology (AU), Wright-Patterson AFB, Ohio, Mar. 1967 (DTIC No. AD651-801).

O. H. Tallman, The Classification of Visual Images by Spatial Filtering, PhD Dissertation, School of Engineering, Air Force Institute of Technology (AU), Wright-Patterson AFB, Ohio, Jun. 1969 (DTIC No. AD858-866).

Primary Examiner—Leo H. Boudreau
Assistant Examiner—A. Anne Skinner
Attorney, Agent, or Firm—Bernard E. Franz; Donald J. Singer

[57] ABSTRACT

The image of a word is taken and the two-dimensional discrete Fourier transform of the image is computed. The transformed image is filtered to the first three harmonics, with both real and imaginary components. These components then make up a total of 49 unique vectors which defines a 49 orthogonal vector space. The vector space is normalized to unity and each image of a word or phrase defines a point within this 49 orthogonal, hypersphere. The same process is done to the image for the Fourier components, where there is only 25 unique vector components. Similar looking words cluster in the hypersphere and the smaller distance from one point to another defines the probability of incorrectly recognizing a word. In a study for the case of two through eleven letters in a word using both 49 and 25 vector space calculations, the results show two through eleven words are recognizable using 49 vector space and possibly the 25 vector space. The 25 vector space shows problems with symmetry (dyslexia) in many of the incorrectly recognized words, which was never the case for the 49 vector space. A conclusion is that people with dyslexia might use a different process to recognize words and by using the real and imaginary components, whole word recognition is possible.

2 Claims, 6 Drawing Sheets

WHOLE WORD, PHRASE OR NUMBER READING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to image analysis of whole words, phrases or numbers, including a Fourier transformation and pattern recognition.

Automation of businesses is dependent on a machine's ability to recognize the input and act according to pre-programmed instructions. Without an input the process of automation is impossible. Unfortunately most inputs are not in a form compatible with automation. An example is the postal service. The average person does not address his letter with a bar code label format. People address their mail with words written on one side of the envelope or package. No two persons' handwriting is the same and no one can write exactly the same way each time. It is not difficult for the human mind to recognize most handwriting but the complexity to build a computer system to do the same has yet to be achieved.

Presently there is no such reading machine which can take a video picture of printed text and identify each word in the picture. The reason for this is the problem of pattern recognition. No two printed words are exactly the same and simply matching the picture of a word to a standard template or model is not sufficient. A one to one correlation is not possible because of all the different types of printing fonts used, the discontinuity within individual characters, the difference in shading between characters, the background noise, and the variation in spacing between characters within words. A pattern recognition system has to identify an input which is similar to a template. An approximation to what is being searched for is possible in some cases but to recognize all the thousands of different words spelled with all the different types of character fonts or handwriting is presently impossible.

Surprisingly somehow, the brain recognizes words each time something is read and recognizes the letters, words, or entire phrases in a single glance, without ever having seen that exact image before. Even with all out super computer technology, it is still not feasible to build a true reading machine that works as well as the human visual system. To build such a machine the computer must model the inputs and categorize them into approximate words or phrases just like the human brain does. How the computer models the inputs will define whether or not it can be used as a reading machine.

Reference for background information and prior studies in this field include:

1. Kabrisky, Matthew—Lecture materials for a course in Pattern Recognition, School of Engineering, Air Force Institute of Technology (AU), Wright-Patterson AFB, Ohio, January 1984.

2. Goble, Larry G., *Filtered 2-Dimensional Discrete Fourier and Walsh Transform Correlation with Recognition Errors and Similarity Judgements*, Dissertation, Ann Arbor, Michigan: University of Michigan, 1975.

3. Bush, Capt Larry F., *The Design of an Optimum Alphanumeric Symbol Set for Cockpit Displays*, MS thesis, School of Engineering, Air Force Institute of Technology (AU), Wright-Patterson AFB, Ohio, December 1977 (Defense Technical Information Center (DTIC) No. ADA053-447).

4. Tinker, Miles A., *Bases for Effective Reading*, Minneapolis, Minn.: University of Minnesota Press, 1966.

5. Simmons, Robin A. *Machine Segmentation of Unformatted Characters*, MS thesis, School of Engineering, Air Force Institute of Technology (AU), Wright-Patterson AFB, Ohio, December 1981 (DTIC No. ADA115-556).

6. Rodoy, Charles H., *Pattern Recognition by Fourier Series Transformations*, MS thesis, School of Engineering, Air Force Institute of Technology (AU), Wright-Patterson AFB, Ohio, March, 1967 (DTIC No. AD651-801).

7. Tallman, Oliver H., *The Classification of Visual Images by Spatial Filtering*, PhD dissertation, School of Engineering, Air Force Institute of Technology (AU), Wright-Patterson AFB, Ohio, June, 1969 (DTIC No. AD858-866).

One approach in solving the reading machine problem is to model how the human visual system categorizes images of words. One view of the Gestalt Theory explains human correlation between the spatially filtered two-dimensional Fourier Transform (2DFT) of the images (reference 1). The human visual system takes information from the retina, transmits it along the optical nerve, to area 17 of the cerebral cortex, and then maps it into area 18 of the cerebral cortex where recognition occurs. The mapping function into area 18 is what Gestalt explains mathematically by the 2DFT. By taking an image, computing the 2DFT of the image, and filtering out everything except the lowest three harmonic terms, the resultant information can be used to categorize the images, words or individual letters into similar known objects. This is what gives the letter 'b' its 'b-ness'. Even though no two b's are the same, the filtered 2DFT of two different b's correlates higher than either 'b' with any other letter.

In 1975, Goble's dissertation concluded that through the use of Euchidian distance matrix, from the filtered DFT's a model of human visual perception could be validated. The distance matrix derived from the 2DFT's of individual letters showed that small Euclidian distances between letters represented a high degree of recognition errors while larger distances represented a low degree of recognition errors. His dissertation gave credibility to the Gestalt Theory (reference 2).

In 1977, Bush's theses compared pyschophysical test results with the Euclidian distance matrix of single letters. Using the 26 letters of the alphabet, each letter was expressed in a 10×14 dot-matrix configuration. The filtered 2DFT of each letter was taken and the 25 real and 24 imaginary components of each 2DFT was used to form 49 energy normalized Fourier components. These Fourier components then defined the location in 49 orthogonal space where each letter was to be located (reference 3).

SUMMARY OF THE INVENTION

An object of the invention is to provide a method of reading text, which locates and recognizes phrases, individual words, or numbers as single units. Another object is to provide a method of recognizing words or numbers like a person with dyslexia, which can be used in medical research to examine the reading disorder of dyslexia.

According to the invention, the image of a word is taken and the two-dimensional discrete Fourier transform of the image is computed. The transformed image is filtered to the first three harmonics, with both real and imaginary components. These components then make up a total of 49 unique vectors which defines a 49 orthogonal vector space. The vector space is normalized to unity and each image of a word or phrase defines a point within this 49 orthogonal, hypersphere. The same process is done to the image for the Fourier components, where there is only 25 unique vector components. Similar looking words cluster in the hypersphere and the smaller distance from one point to another defines the probability of incorrectly recognizing a word.

In a study for the case of two through eleven letters in a word using both 49 and 25 vector space calculations, the results show two through eleven words are recognizable using 49 vector space and possibly the 25 vector space. The 25 vector space shows problems with symmetry (dyslexia) in many of the incorrectly recognized words, which was never the case for the 49 vector space.

A conclusion is that people with dyslexia might use a different process to recognize words; and by using the real and imaginary components, whole word recognition is possible.

DETAILED DESCRIPTION

The invention is disclosed in my thesis (AFIT/GEO/ENG/84D-4) titled "Whole Word Recognition on Low Frequency Fourier Complex and Amplitude Spectrums" for the School of Engineering, Air Force Institute of Technology (AU), Wright-Patterson Air Force Base, December 1984, a copy of which is included with the application as filed and incorporated by reference.

The thesis includes further background information, and a program listing for the method of reading whole word text.

Figure 1:
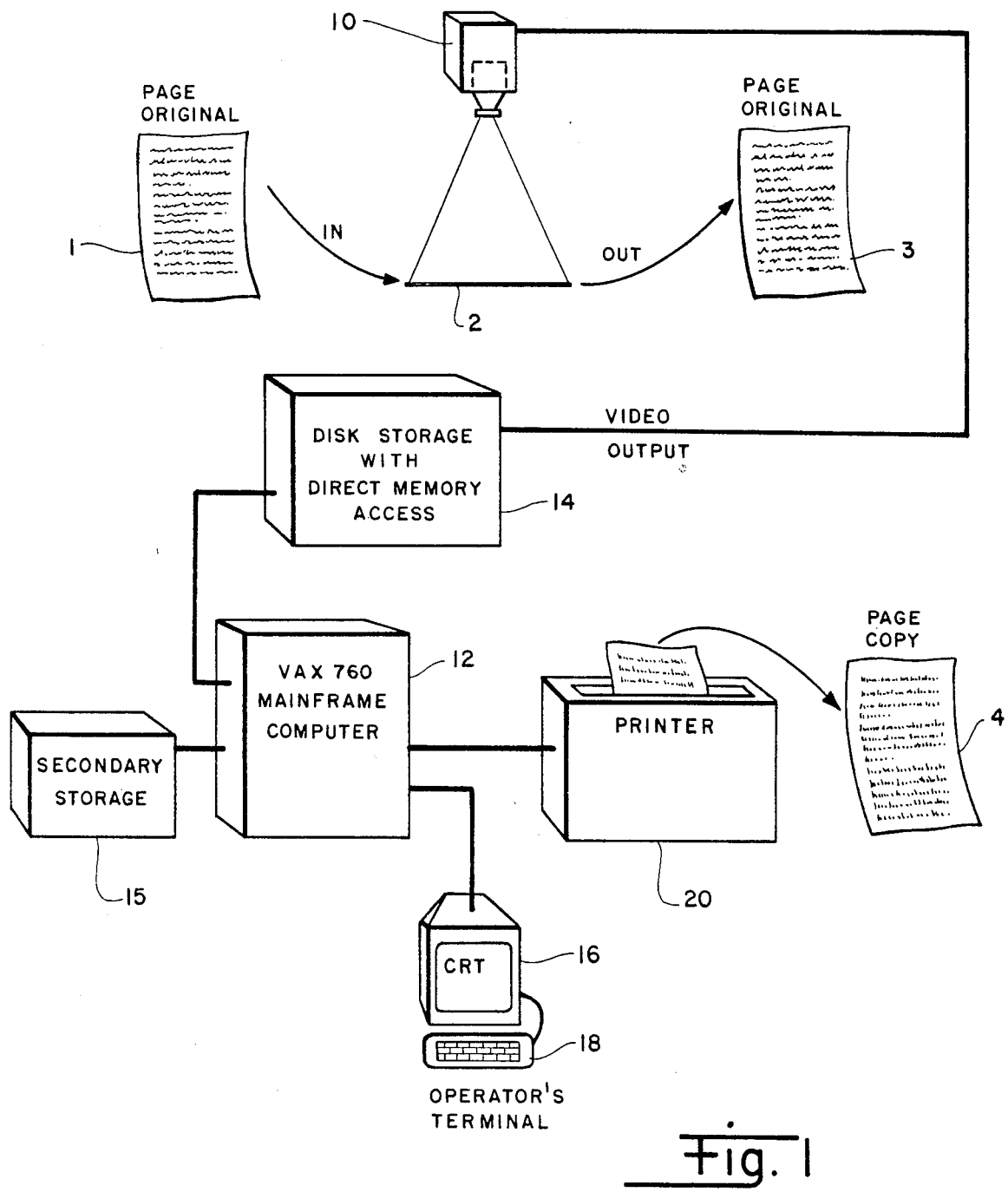
FIG. 1 is a system block diagram showing the units of apparatus for reading text.
Figure 2:
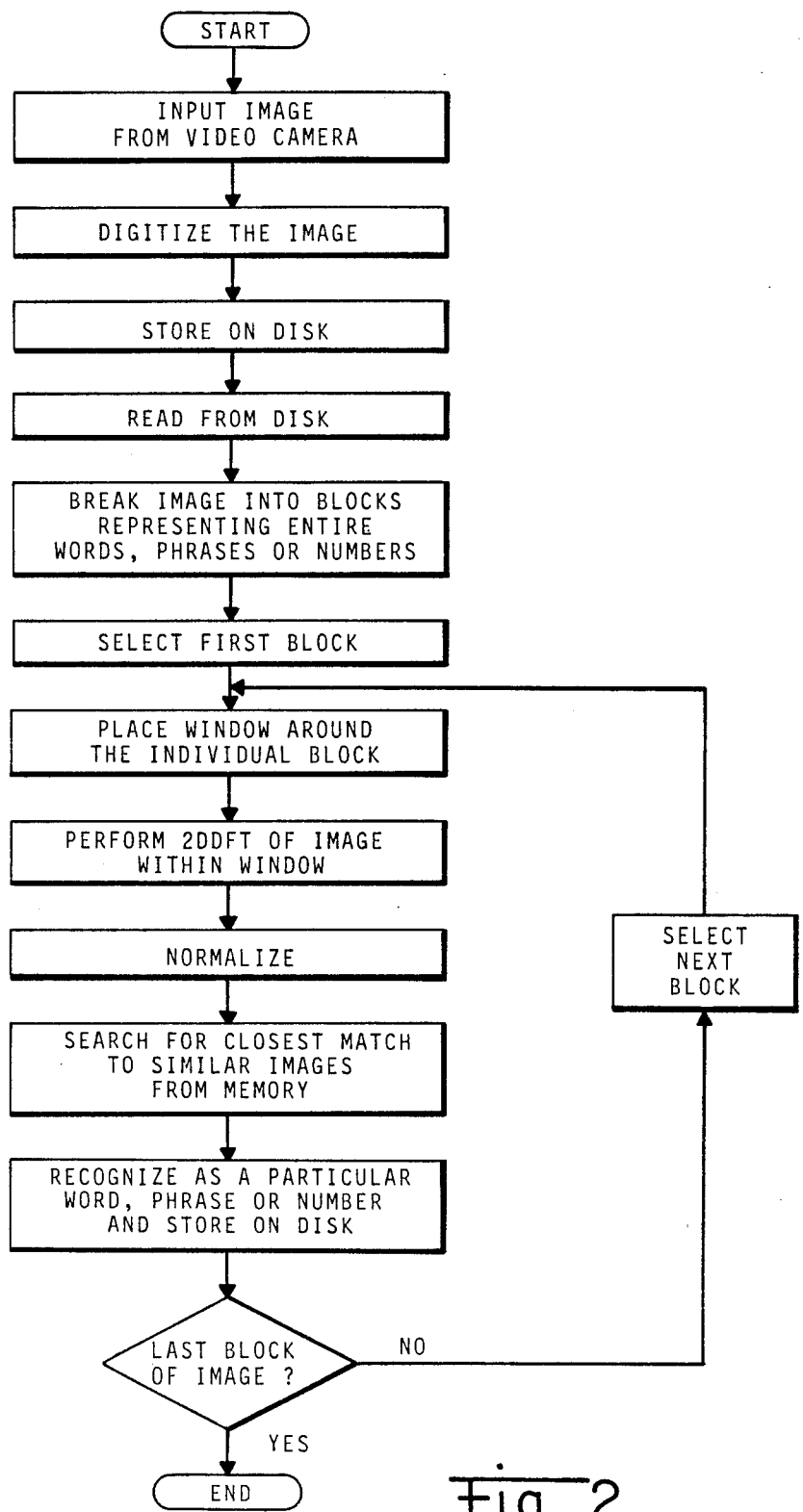
FIG. 2 is an overall flow chart for the method of reading according to the invention.
Figure 3A:
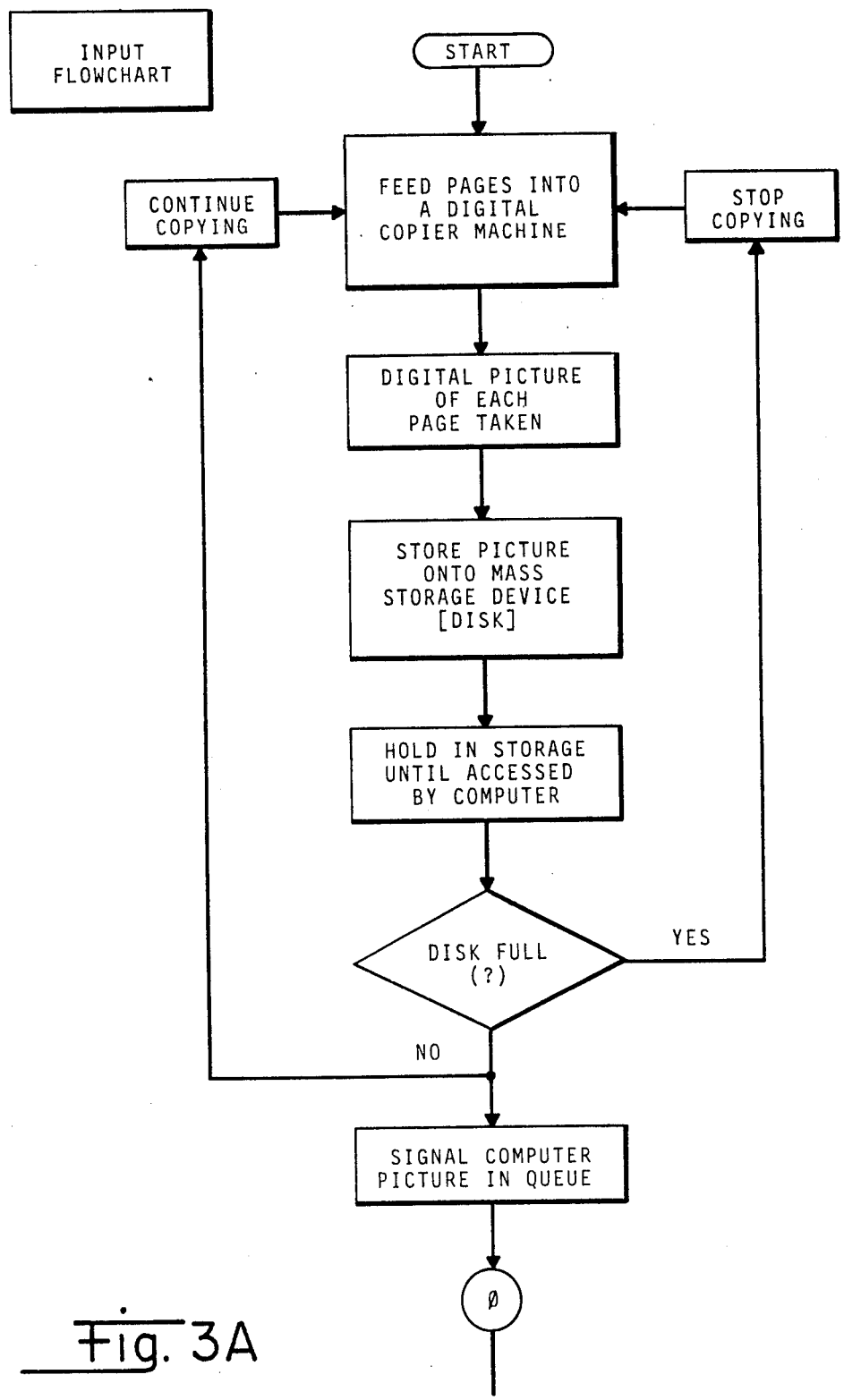
FIGS. 3A-3D comprise a more detailed flow chart.
Figure 3B:
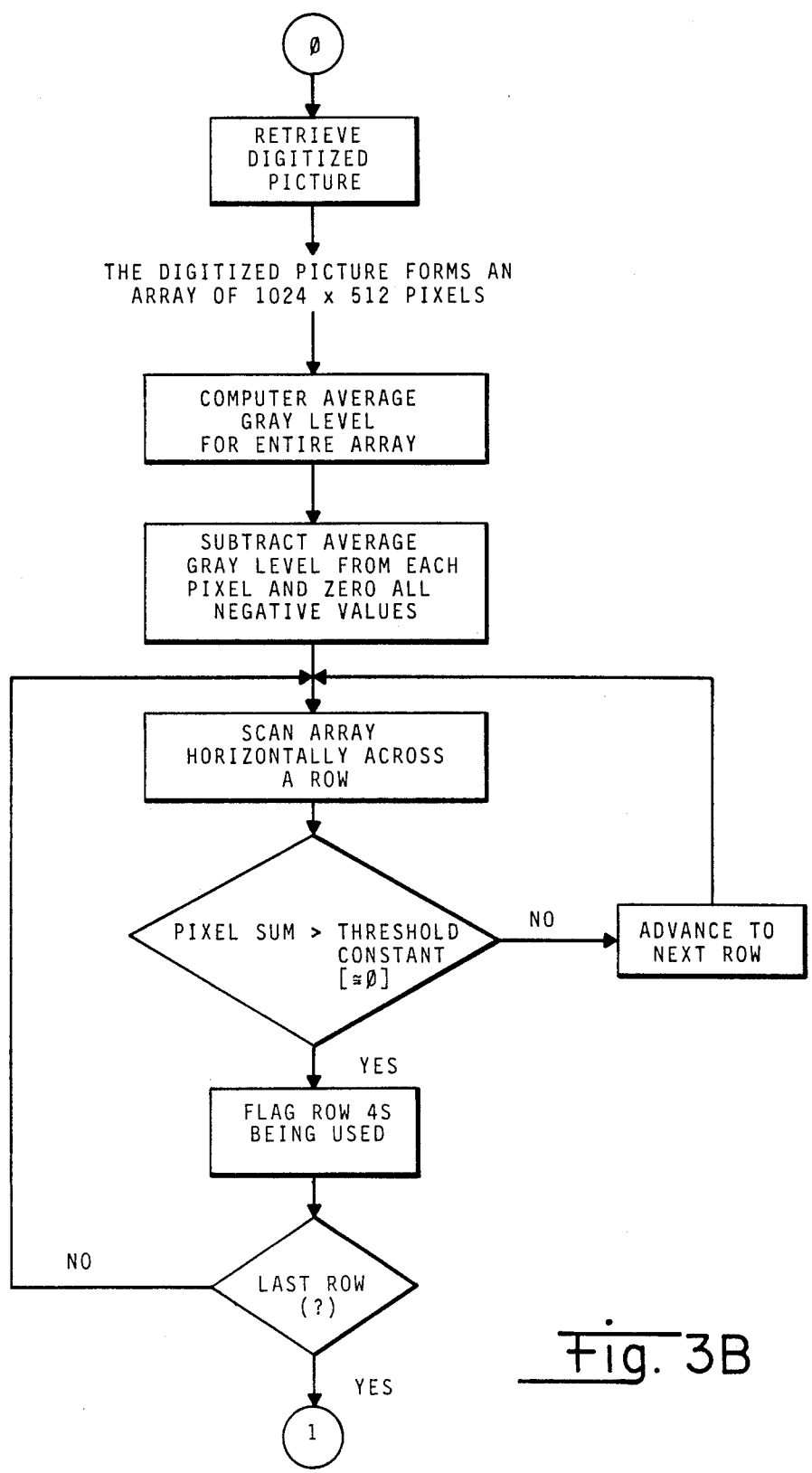
Figure 3C:
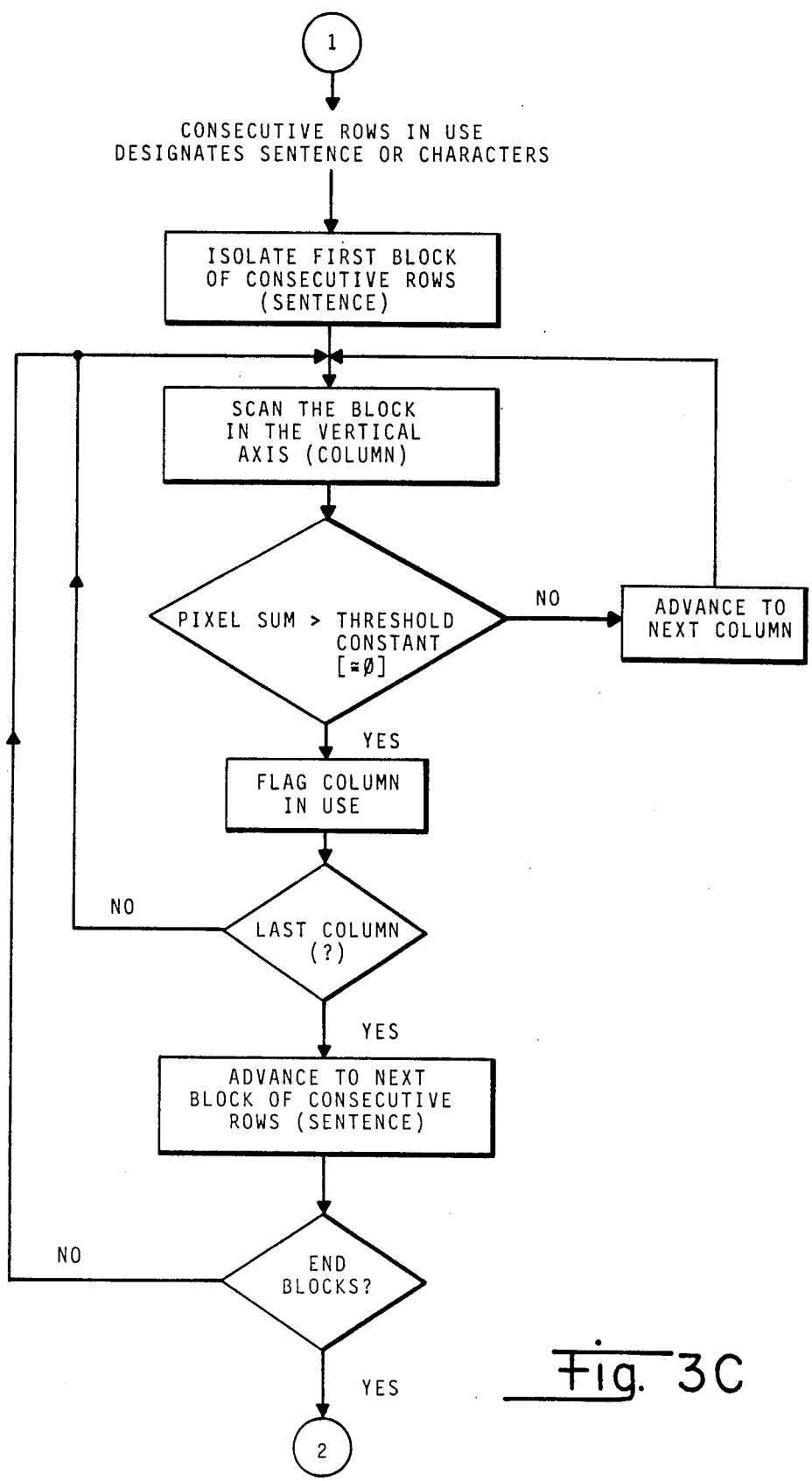
Figure 3D:
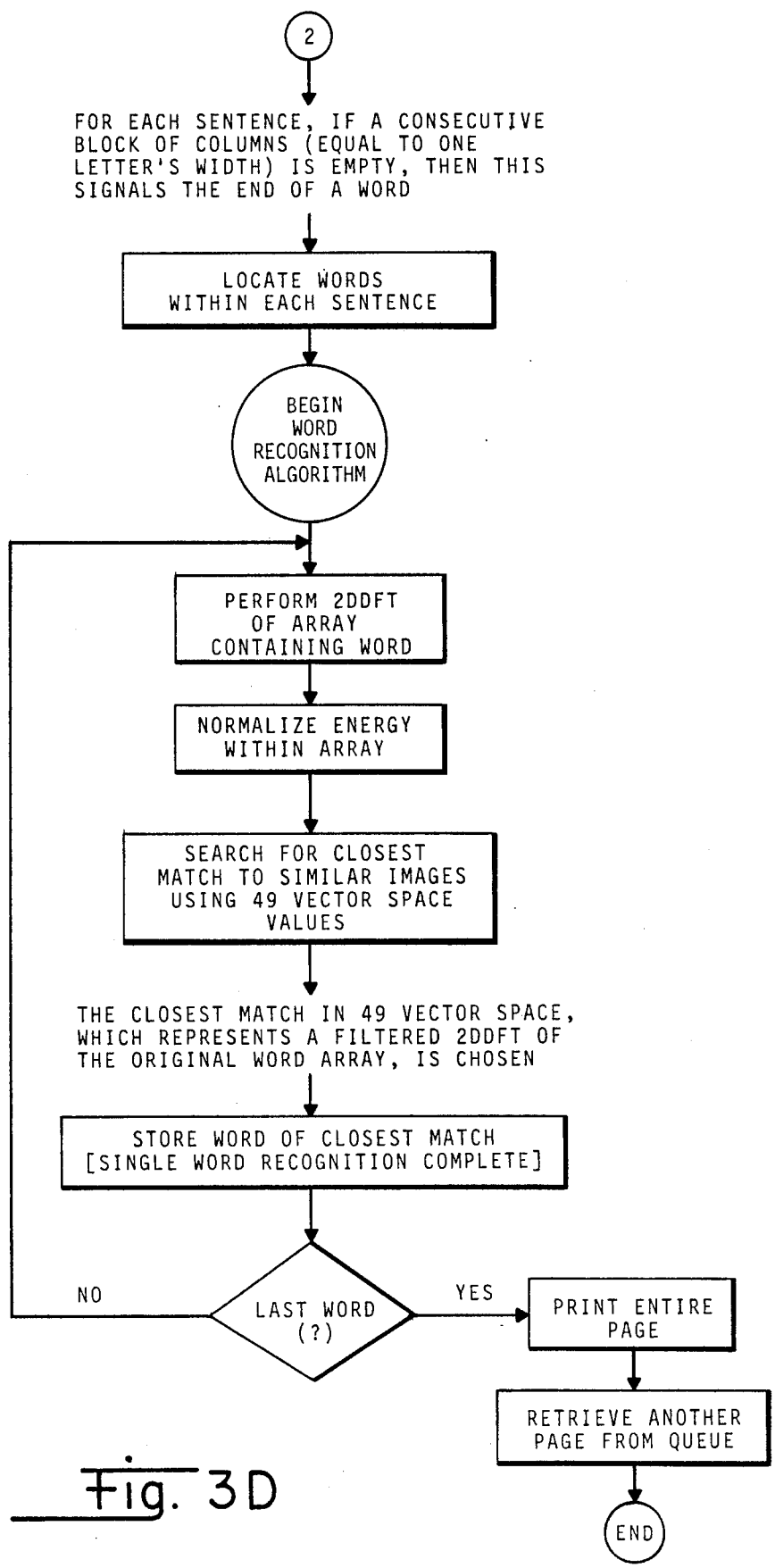

As shown in FIG. 1, the equipment comprises off-the-shelf parts including a video camera 10, a and computer 12, disk storage apparatus 14, secondary storage 15, a CRT terminal 16, a keyboard 18, and a printer 20. The operation is shown by the flow chart in FIG. 2. FIGS. 3A-3D comprise a more detailed flow chart.

A page or surface 1 with printed text is placed in the field-of-view of the video camera 10 at position 2, then out as shown at 3. The image is taken and fed into disk storage 14 (which has direct memory access). The image is subsequently supplied to the computer 12, which forms a digital picture of the image. The image is stored for further processing.

The computer 12 breaks the image up into blocks of data, wherein the blocks represent entire words, phrases, or numbers. The program run by the computer places a window around the individual blocks and performs a two-dimensional discrete Fourier Transform (hereafter 2DDFT) of the image within the window. The transformed image is filtered to the first three harmonics, with both real and imaginary components. These components then make up a total of 49 unique vectors which defines a 49 orthogonal vector space. The vector space is normalized to unity and each image of a word or phrase defines a point within this 49 orthogonal, hypersphere. The same process is done to the image for the Fourier components, where there is only 25 unique vector components. Similar looking words cluster in the hypersphere and the smaller distance from one point to another defines the probability of incorrectly recognizing a word.

Each block within the initial video image is recognized until all of the text has been recognized. If the algorithm is changed slightly, the computer will read the text similar to a person having dyslexia. This could be used in helping a dyslexic reader by developing a character set which is independent of symmetry information.

In a study for the case of two through eleven letters in a word using both 49 and 25 vector space calculations, the results show two through eleven words are recognizable using 49 vector space and possible the 25 vector space. The 25 vector space shows problems with symmetry dyslexia) in many of the incorrectly recognized words, which was never the case for the 49 vector space.

A conclusion is that people with dyslexia might use a different process to recognize words; and by using the real and imaginary components, whole word recognition is possible. The results of the 2DDFT are energy normalized and a search is made for the closest match to a similar image from memory on the disk. If found, this match recognizes the image within the window as a particular word, phrase, or number.

It is understood that certain modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

What is claimed is:

1. The method of recognizing text, with a system having representative digital images stored in memory, comprising the steps:
    (a) inputting an image representing text;
    (b) digitizing the image to form a digital picture thereof;
    (c) storing the image in memory;
    (d) breaking the image into blocks of data, wherein the blocks represent entire words, phrases, or numbers;
    (e) placing a window around the first individual block;
    (f) performing a two-dimensional discrete Fourier Transform (2DDFT) of the image within the window;
    (g) filtering to the first three harmonics, with both real and imaginary components, these components then making up a total of 49 unique vectors which define a 49 orthogonal vector space;
    (h) energy normalizing to unity the 49 unique vectors, which will eliminate the effects due to image brightness;
    (i) searching a library of known 49 orthogonal vectors and finding the closest match by euclidian distance;

(j) after finding a closest match, recognizing the image within the window as a particular word, phrase, or number, and storing the result in memory;

(k) placing a window around the next individual block and repeating steps (f) through (j) until all blocks within the image are recognized; and (m) outputting the resulting phrases, words, or numbers as text;

and wherein symmetry properties are used so that the image for each block is recognized similar to a person having dyslexia.

2. The method according to claim 1, wherein the phase components of the 2DDFT are not used and only the unique 25 orthogonal vectors from the magnitude components are used, except for the exclusion of the phase components, steps (a) through (m) are repeated using the 25 vector space wherein the image recognized by the computer in step (i) will be similar to a person having dyslexia.

* * * * *